AUTOMATIC GAIN OR FREQUENCY CONTROL

Filed Sept. 20, 1954 3 Sheets-Sheet 1

INVENTORS
KENNETH R. McCONNELL
PETER R. MARZAN
BY John J. Rogan
ATTORNEY

AUTOMATIC GAIN OR FREQUENCY CONTROL

INVENTORS
KENNETH R. McCONNELL
PETER R. MARZAN
BY John J. Rogan
ATTORNEY

INVENTORS.
KENNETH R. Mc CONNELL
PETER R. MARZAN
BY John J. Hogan
ATTORNEY.

United States Patent Office 2,824,168

Patented Feb. 18, 1958

2,824,168

AUTOMATIC GAIN OR FREQUENCY CONTROL

Kenneth R. McConnell and Peter R. Marzan, New York, N. Y., assignors to Times Facsimile Corporation, New York, N. Y., a corporation of New York Application September 20, 1954, Serial No. 456,992

26 Claims. (Cl. 178—6.6)

This invention relates to electrical control systems and more especially it relates to automatic control of an amplifier, oscillator or similar device.

The principal object of the invention is to provide an improved automatic setting arrangement for the gain, frequency or other controllable characteristic of an electron tube, a saturable reactor or transistor system or similar circuits whereby the controlled characteristic remains at the set value between setting periods.

Another object is to provide an automatic gain or frequency control for electron tube, saturable reactor or transistor systems employing as a control element a pulse-counting tube.

Another object is to provide an improved automatic control for facsimile recorders and the like whereby the gain or loss of an amplifier or attenuation device in the signal circuit is automatically set at the value required to give the predetermined optimum signal value for recording and the setting is maintained at this value during the recording of a complete facsimile transmission regardless of the character of the facsimile copy.

A further object is to provide an improved automatic control for facsimile receivers which checks whether the gain is set for optimum recording level at the end of each scanning line and readjusts the gain when necessary to maintain the optimum recording level.

Another object is to provide a system for connecting the circuits which effects a change in the gain or loss of a transducer only when line-up signals are received.

A feature of the invention relates to a system for controlling an electron tube arrangement in response to the level of an input signal during line-up intervals by converting the level variations of that signal into a series of pulses correlated with the departure of said level from a predetermined value, and applying said pulses to control a pulse-counting tube which automatically adjusts the bias of an input amplifier to maintain the output signal of this amplifier at a predetermined optimum level.

Another feature relates to an automatic frequency control system for an electron tube oscillator, which system employs a frequency comparator, a pulse generator, and a step-by-step pulse-counting device whose setting automatically stabilizes the frequency of said oscillator.

A further feature relates to a novel automatic control arrangement for an electron tube system employing a pulse-counting tube of the step-by-step discharge-transferring type.

A still further feature relates to the novel organization, arrangement, and relative interconnection of parts which cooperate to provide an improved automatic stabilizing arrangement for electron tube amplifiers, oscillators, and the like.

Previous attempts have been made to compensate for variations in the transmission loss of a facsimile signal on a wire or radio circuit by using an automatic gain control circuit operating from the black or white signal level or from a pulse which is transmitted at a time corresponding to the scanning of the paper clamp bar. The major drawback to the electronic systems is that there is no method of maintaining the gain at the fixed setting between the intervals when a signal of reference value is received. An automatic gain control system which operates on the white signal of the facsimile copy may be suitable for certain types of copy only but would certainly be upset when scanning a long period medium gray. With systems which use the given reference level during the paper clamp bar intervals, an R. C. circuit is generally used to maintain the gain between these intervals. The condenser must necessarily discharge through the resistor between intervals and the gain cannot be held constant.

One of the major advantages of the system to be described is that the gain remains constant between the intervals at which it is set.

Systems employing mechanical or motor-driven regulating devices have been devised for compensating for variations in transmission loss. One of these systems is described in our copending patent application, Serial No. 351,184, filed April 27, 1953. The speed of operation of any of the mechanical systems is limited, however, by the mechanical inertia of the moving parts.

The system according to this invention moves an electronic beam and is, therefore, essentially inertialess, and the gain may be set in less than a millisecond by the use of the proper counter tube. In addition, there is no wear of moving parts, brushes, or mechanical wipers in this system.

Figure 1:
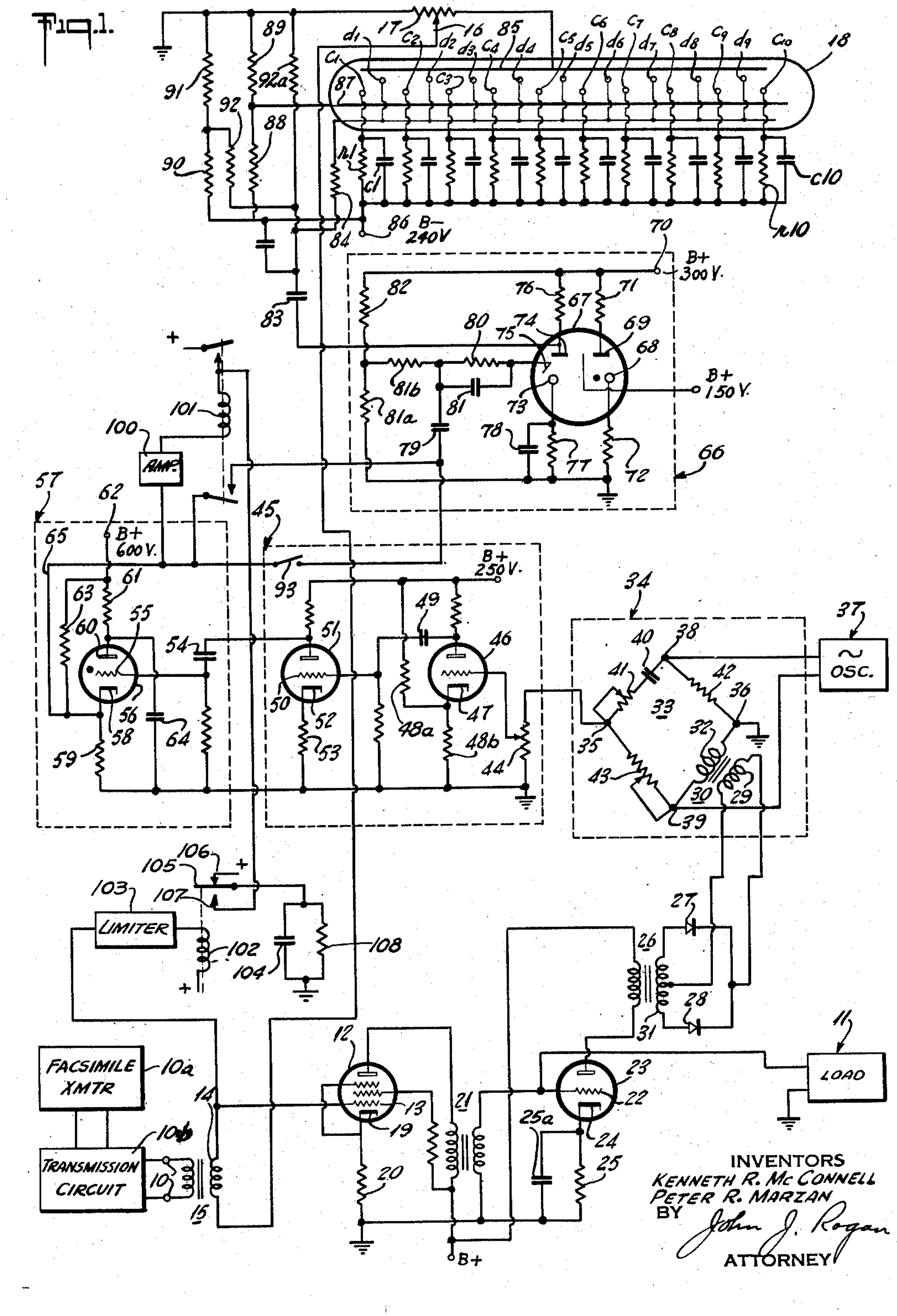
Fig. 1 is a schematic wiring diagram of a facsimile system employing the automatic gain control of the present invention.

Referring to Fig. 1, there is schematically shown a source of input signals, for example whose peak level may vary due to changes in transmission loss. This source, for example, may comprise a facsimile transmitter 10*a* and transmission circuit 10*b*. This signal source is connected to a load device or utilization circuit 11 which requires a predetermined peak signal level and to which the input signals are applied after amplification in a suitable signal amplifier represented schematically by the amplifier tube 12 whose gain is automatically adjusted to the required amount to deliver the optimum signal into the load 11. Merely for illustration, tube 12 is shown as of the variable gain type whose control grid 13 is returned to ground through the secondary winding 14 of a signal input transformer 15 in series with the adjusting arm 16 of a potentiometer resistor 17. Tube 12 can be a variable-mu pentode or a super control amplifier. The direct current potential developed across resistor 17 is controlled by a step-by-step pulse-counting tube 18 to be described. Thus, the gain of amplifier tube 12 is controlled by tube 18. The cathode 19 can be self-biased to a normal predetermined amount by the cathode bias resistor 20.

The amplifier output from tube 12 is coupled by transformer 21 to the load 11 and also to control grid 22 of another amplifier tube 23 whose cathode 24 is self-biased by the cathode resistor 25 with its conventional by-pass condenser 25. The output of tube 23 is coupled by transformer 26 to a full wave rectifier comprising two crystal diodes 27, 28, whose load includes the control winding 29 of a saturable reactor element 30. Reactor 30 is of the balanced type such that no voltage is induced in winding 32 due to a change in current through winding 29. The winding 29 has one terminal connected to the electrical mid-point of winding 31, and its other terminal is connected to the common junction between the similar electrodes of rectifiers 27, 28. Thus, a direct current potential is developed across the winding 29 with a magnitude that varies with any change in the level of the input signal from source 10 which causes a corresponding change in impedance of winding 32.

Winding 32 constitutes one ratio arm of an alternating current impedance bridge 33. Bridge 33 serves as a level detector device 34 which provides a voltage across its conjugate output terminals 35, 36 only when the output signal across the load 11 departs from its predetermined level. For that purpose a source of alternating current voltage 37, for example 10 volts at 1800 cycles per second, is applied to the other pair of conjugate points 38, 39 of the bridge. One ratio arm of the bridge is constituted of a condenser 40 and an adjacent potentiometer resistor 41. The second ratio arm is constituted of a fixed resistor 42. The third ratio arm is constituted of an adjustable potentiometer resistor 43. The fourth ratio arm is comprised of the saturable reactor 30.

The voltage developed across the points 35 and 36 is applied through an adjustable input potentiometer 44 forming part of an amplifier 45. This amplifier may comprise a grid-controlled triode 46 whose cathode 47 is biased by the voltage divider resistors **48*a* and 48*b*. The plate or output circuit of tube 46 is coupled through condenser 49 to the control grid 50 of another triode amplifier tube 51 whose cathode 52 is self-biased by the cathode resistor 53. The amplified potentials developed at the plate or output circuit of tube 51 are applied through condenser 54 to the control grid 55 of an oscillator tube 56 forming part of a gas tube relaxation oscillator 57, whose cathode 58 is biased to plate-current cutoff by the voltage divider resistors 59 and 63. The plate or anode 60 of tube 56 is connected through a suitable load resistor 61 to a suitable high potential direct current tap 62 of the direct current power supply. The plate 60 is returned to the ground through a condenser 64. Resistor 61 and condenser 64** control the charging time of the oscillator.

The values of the various resistances and the condenser associated with tube 56 are chosen so as to cause this tube to act in the well-known manner as a gas tube relaxation oscillator which develops for example 60 cycle relaxation oscillations across a cathode load resistor 59. The voltages on the electrodes of tube 56 and the voltage divider resistors 59 and 63 are chosen so that the tube 56 is normally at cutoff, that is, it does not generate any output oscillations but is triggered into oscillating condition only when a control voltage is applied to its control grid 55 from the amplifier 51. While one particular form of relaxation oscillator 57 is illustrated, it will be understood that any other well-known form may be employed, for example such as those described in section 6, paragraph 9, pages 511–516 of "Radio Engineers Handbook" by Terman, 1st ed., published by McGraw-Hill Book Company, Inc.

The oscillatory output from tube 56 is applied to the input of an amplifier 100 whose output is connected with the winding of a relay 101. The circuit for that winding is controlled by another relay 102 whose operating winding is connected to the signal input transformer winding 14 through any well-known signal limiter 103. In the absence of any input signals, relay 102 is deenergized and the condenser 104 is charged positively from the positive direct current terminal through the normally closed relay contacts 105, 106. When an input signal is received at transformer 15, relay 102 operates and applies an operating voltage to the winding of relay 101. This relay, therefore, remains operated for a short interval determined by the charge on condenser 104. If the level of the received signals at transformer 15 is of the proper value for the load 11, the tube 56 is not triggered and relay 101 releases, and the gain of amplifier 12 remains at its previous setting. If, however, the level of the received signal is different from that required for the load 11, the system automatically adjusts the gain of amplifier 12 as will now be described.

For that purpose, the oscillatory output from oscillator 57 is applied over conductor 65 to the input of any well-known pulse shaper and triggering tube network 66. Merely for illustrative purposes, this shaper may comprise a triggering tube 67 of the cold cathode gaseous conduction type comprising a cold cathode 68 and its associated anode 69 which are connected between a suitable high voltage direct current signal terminal 70 and ground through respective anode resistor 71 and cathode resistor 72. The gap between electrodes 68 and 69 is known as the priming gap. An additional pair of electrodes comprising a cold cathode 73 and its associated anode 72 constitute the main discharge gap with which is associated the triggering electrode 75. The cathode 73 and anode 74 are connected across the direct current point 70 and anode resistor 76 and cathode resistor 77 which is shunted by a by-pass condenser 78. By choice of suitable circuit elements, the tube 67 is triggered into the conductive condition between electrodes 73 and 74 by the positive voltage pulse applied to triggering electrode 75 from the relaxation oscillator 57 through condenser 79 in circuit with resistor 80 and shunt condenser 81. Positive voltage pulses, therefore, are developed at the anode 74 whose shape can be determined by the various resistors and condensers above mentioned and also by the additional resistor network comprised of resistances **81*a*, 81*b*, 82**. It will be understood, of course, that any other well-known form of pulse shaper and triggering tube network may be employed.

These positive pulses are applied through condenser 83 and coupling resistor 84 to all the discharge-transferring or auxiliary cold cathodes *d*1–*d*9 of pulse-counting tube 18. This tube may be of any well-known gas filled type represented for example by the type G10/240E manufactured and sold by Standard Telephone and Cables Ltd. The tube 18 has, for example, a series of ten main cold cathodes *c*1–*c*10, and a common anode 85. Each of the main cathodes is connected to a suitable negative direct current potential point 86, for example −240 volts, through a respective cathode resistor *r*1–*r*10 and respective shunt condensers *c*1–*c*10. The resistors *r*1–*r*10 are of respectively different values, with the successive resistors differing from each other by amounts selected to give desired steps. A shield electrode 87 is provided in common to all the cathodes and is maintained at a suitable positive bias by means of the voltage divider resistors 88, 89 connected across the point 86 and ground. Likewise, the anode 85 is normally biased positively by means of the voltage divider resistors **90, 91, 92, 92*a***.

The main cathodes *c*1–*c*10 are designed and positioned with respect to the auxiliary cathodes so that by applying successive positive pulses through the condenser 83, the discharge moves from one main cathode to the next adjacent main cathode. This discharge is stabilized at the cathode corresponding to the last received pulse. For example, when the circuits are originally closed but with device 57 disconnected, a sufficient number of positive pulses can be applied through condenser 83 to localize the glow discharge on the cathode *c*5. Each of these cathodes may have a transparent numerical indicator which becomes lighted when the corresponding cathode is sustaining its glow discharge. For a detailed description of the construction and function of such gaseous discharge pulse-counting tubes, reference may be had to "Electronic Engineering," June 1952, pages 272, 273, or to "Electronic Engineering," May 1950, pages 173, 177. Merely for simplicity, the tube 18 is shown schematically in longitudinally developed schematic form. Actually, the various electrodes are arranged in concentric circular array as described in the above mentioned publications.

This initial adjustment or pre-positioning of the discharge on the #5 cathode is, of course, effected with the device 57 disconnected, for example by opening switch 93. Thus, an input signal of the desired predetermined level from the source 10 and a signal from source 37 are applied to device 34, and that device is then manually balanced. The switch 93 can then be closed, and under these conditions the discharge remains stabilized on the *c5* cathode. If the input signal should increase, for example by 1 db, the device 34 becomes unbalanced and the device 57 generates oscillations which result in shaped positive pulses from the device 66 being applied to the auxiliary cathode *d6*. This causes the discharge to be transferred from cathode *c5* to cathode *c6* and causes a corresponding increase in the negative bias voltage on control grid 13 of amplifier tube 12, thus restoring to its predetermined level the amplified output level which is applied to the load 11. If the input signal level should be decreased, for example 1 db, the discharge in tube 18 will continue to step through cathodes *c6*, *c7*, *c8*, *c9*, *c10*, *c1*, *c2*, *c3*, and will stop at cathode *c4* which will result in the proper bias being applied to control grid 13 to restore the output level of the amplifier to its predetermined value.

By employing a gaseous discharge pulse-counting tube of the reversible type, it is not necessary for the cathode discharge to move progressively always in the same direction. For example, if the pulse-counting tube is of the reversible type such as disclosed in "Electronic Engineering," May 1950, pages 173–176, a decrease of 1 db in the input signal would cause the tube to step backwards from the pre-positioned location on the *c5* cathode to the *c4* cathode without having to go through the cathodes *c6*, *c7*, *c8*, *c9*, *c10*, *c1*, *c2*, *c3*.

Figure 2:
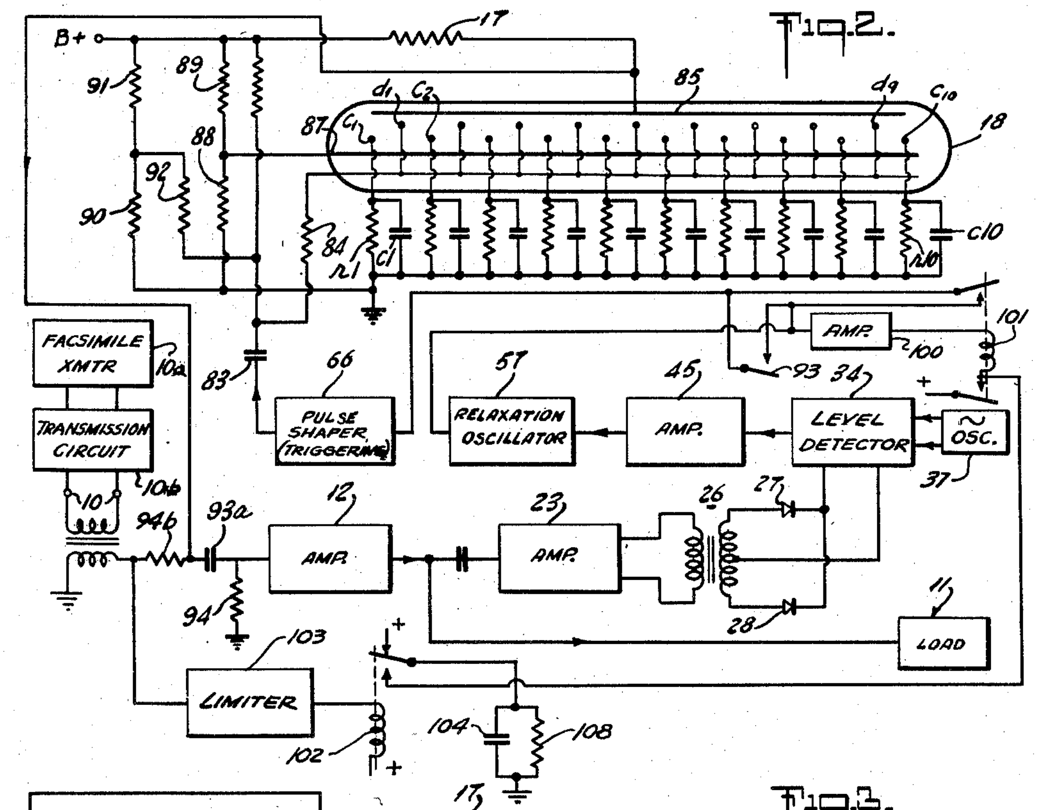
Fig. 2 is a modification of the system of Fig. 1.

Fig. 2 shows a modification of the system of Fig. 1 wherein the anode 85 of the pulse-counting tube 18, instead of automatically applying and adjusting gain-control bias voltage to the amplifier tube 12, is connected in shunt to the input of that amplifier tube. The various elements shown in Fig. 2 which are identical with those of Fig. 1 bear the same designation numerals. In this embodiment, the anode 85 of counting tube 18 is connected to the input of amplifier 12 through the direct current blocking condenser 93*a* which is connected to the input of amplifier 12 through the coupling impedance or resistance 94. The series impedance or resistance 94*b* combines with the shunt impedance of the counting tube 18 to form a potentiometer. Therefore, when the gaseous discharge is localized on any particular main cathode of tube 18, it effectively shunts the input circuit of amplifier 12 with the anode to ground impedance which consists of the anode to cathode impedance of the tube 18 plus the impedance of the cathode resistor and condenser of the particular selected cathode, thus automatically varying the input level to the tube 12 to maintain its output at the predetermined level.

While Fig. 2 shows the pulse-counting tube and the associated automatic controls connected to provide an automatically adjustable shunt impedance to the amplifier, it will be understood that this amplifier 12 may be of the fixed gain type and the selected anode-to-cathode impedance of tube 18 can be connected as a series impedance to vary the input signal to such a fixed gain amplifier, thus maintaining the output level of the signal at a predtermined value.

Figure 3:
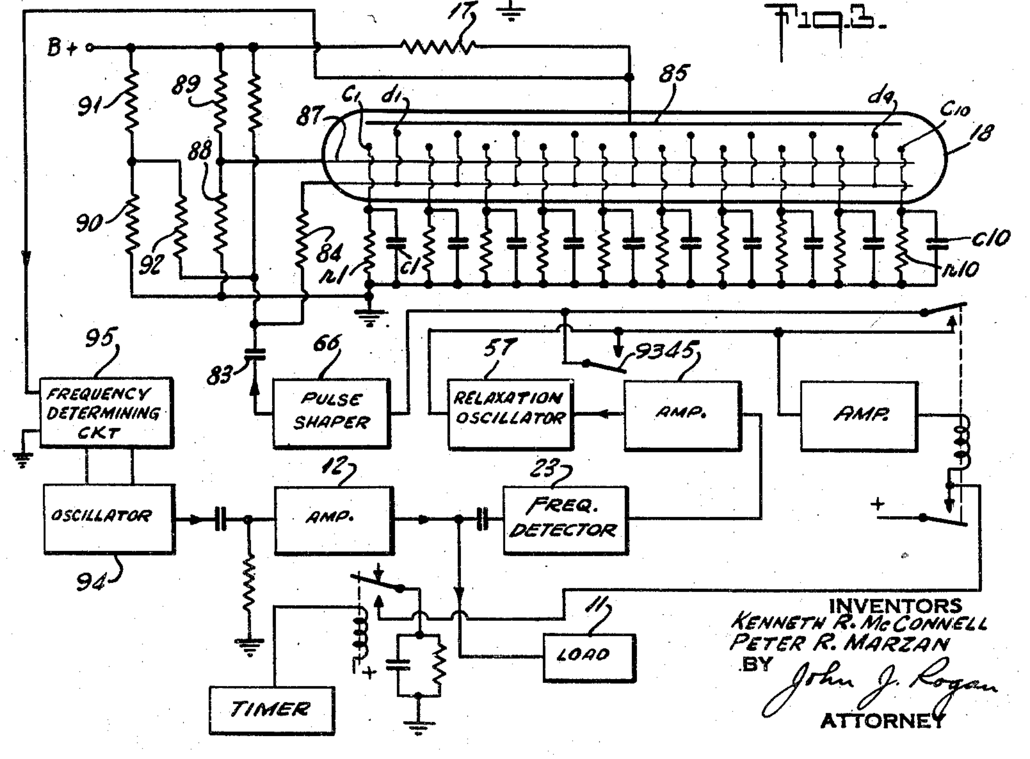
Fig. 3 shows the invention applied to the stabilizing of the frequency of an electron tube oscillator.

Fig. 3 shows a modification of the invention for stabilizing the frequency of an oscillator 94. This oscillator 94 may be of any well-known type having associated therewith a frequency-determining circuit 95. For example, device 95 may be a reactance tube which is connected in the frequency-determining portion of the oscillator 94. The elements of Fig. 3 which are identical with those of Figs. 1 and 2 bear the same designation numerals. In this embodiment the stepping of the discharge from one main cathode of tube 18 to the next main cathode correspondingly varies the time constant of the circuit associated with the device 95, thus automatically maintaining the oscillator 94 at its predetermined frequency. It is believed that the operation of the system of Fig. 3 and the stabilizing of the frequency of oscillator 94 will be clear from the foregoing description of Figs. 1 and 2.

Figure 4:
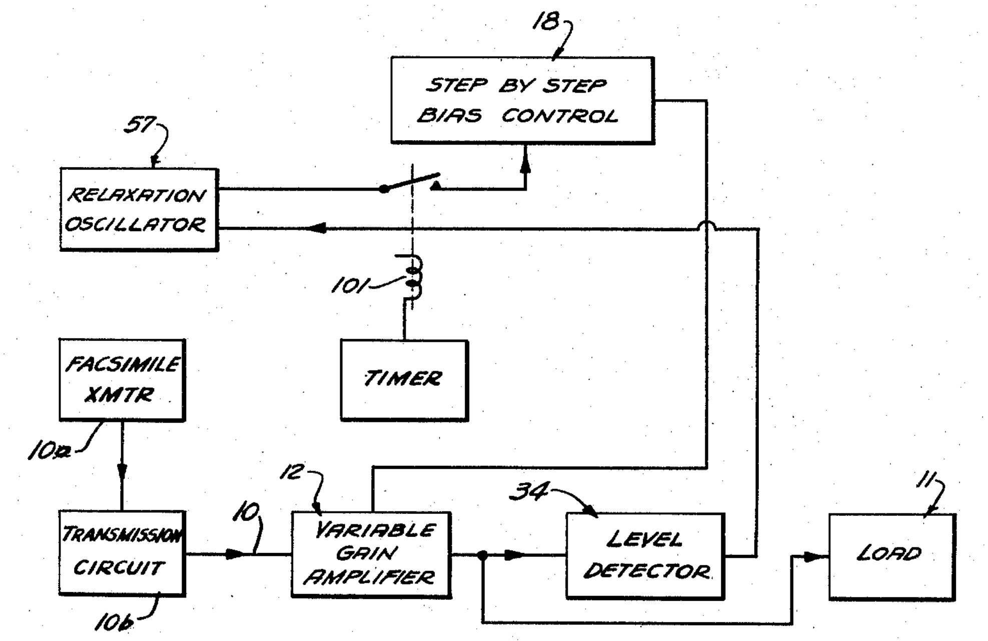
Fig. 4 is another modification of Fig. 1.

Fig. 4 shows a further modification of the system of Fig. 1 wherein the relay 101 which controls the step-by-step bias control tube 18, instead of being operated by the output of the relaxation oscillator 57, is operated under control of a suitable timer or clock-controlled switch which closes the circuit of relay 101 only at predetermined spaced intervals. The remainder of the system of Fig. 4 can be the same as that of Fig. 1, it being understood that the transmission time schedule is correlated with the timer so that the level control compensation is available during the times determined by the operation of the timer. The gain of the signal amplifier remains constant between compensation times regardless of signal amplitude.

Figure 5:
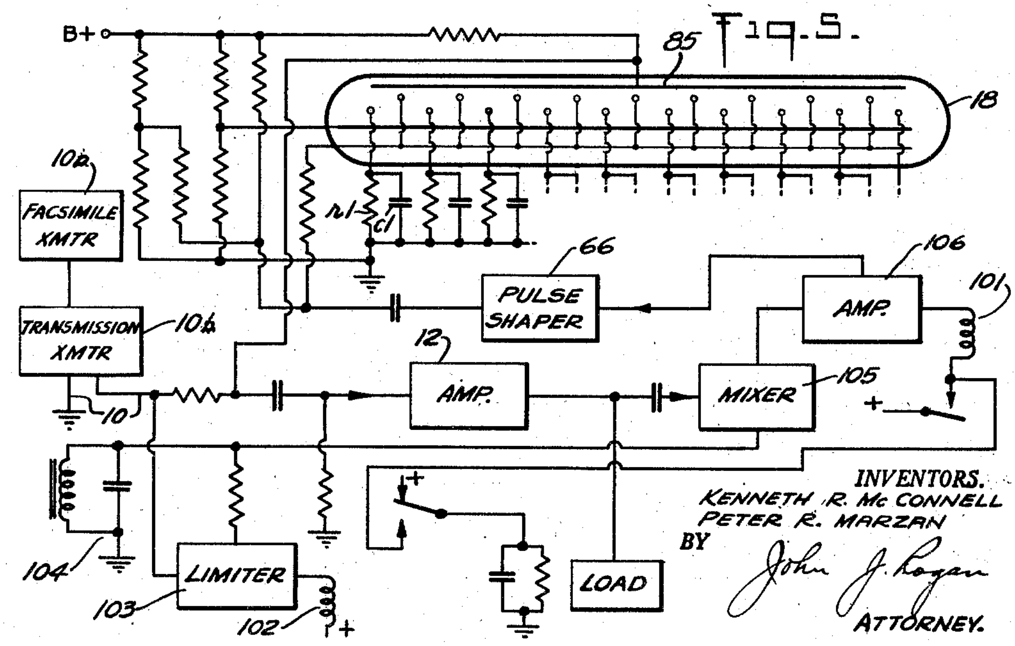
Fig. 5 shows a modification embodying the same principle for automatically setting the gain of a facsimile receiver.

Fig. 5 shows a modification of the system of Fig. 1, and parts of Fig. 5 which are the same as corresponding parts of the preceding figures bear the same designation numerals. In Fig. 5 the impedance bridge 34, the amplifier 45 and the relaxation oscillator 57 have been replaced by a different level-detecting circuit which produces pulses for the pulse shaper when the output from amplifier 12 deviates from the optimum value during the line-up period. A standard voltage signal is derived from the input signal by using the amplitude limiter 103 whose output is coupled to a tuned circuit 104 which is resonant at the frequency of the input signal. Since the B supply to the limiter is constant, the output of the tuned circuit will be a constant frequency, constant amplitude signal. The frequency of this signal is exactly the same as that from the amplifier tube 12 but its phase is 180 degrees different. These two signals are added in the balanced mixer 105. When the amplitude of the signal delivered from amplifier 12 is the same as the standard signal derived from the limiter, there is no output from the mixer since the two signals cancel completely. This output corresponds to the optimum level. If the signal input changes so that during the next line-up period it is either higher or lower than before, the standard signal from the limiter 103 and that from the amplifier 12 will not balance out completely. This unbalanced signal is amplified in amplifier 106 and delivered to the pulse shaper 66 which steps the counting tube 18 in the manner hereinabove described until the signal output from amplifier 12 is again at the optimum level.

Various changes and modifications may be made in the disclosed embodiments without departing from the spirit and scope of the invention.

What is claimed is:

1. An automatic stabilizing arrangement of the kind described comprising, in combination, a source of message signals to be stabilized, means for generating reference signals to replace the message signals during predetermined periods, an adjustable gain device, a comparator device connected to the output of said adjustable gain device, means under the control of said comparator device for producing a series of pulses when the reference signal is not at the optimum level at the comparator, a counting tube, means to apply said pulses to step the discharge in said counting tube to successive settings, means under control of the counting tube for varying the gain of the adjustable gain device until the output at said comparator reaches the desired value and means for disabling said pulse-counting tube to maintain the adjustable gain device at a fixed gain at least until the next control period.

2. An automatic stabilizing arrangement according to to claim 1, in which signals produced by scanning facsimile copy during known periods are used as reference or control signals.

3. An automatic stabilizing arrangement according to claim 1, which includes transmitting and receiving stations, a source of message signals at the transmitting station and a transmission path of variable loss between the transmitting and receiving stations, in which the comparator and pulsing means are arranged to compensate for variations of loss in transmission of said signals.

4. An automatic stabilizing arrangement of the kind described comprising, in combination, a signal device whose output is to be stabilized, a step-by-step pulse-counting tube of the type having an anode and a series of separate cathodes to each of which a discharge current can be selectively moved, means to produce control pulses when the output characteristics of said device change, means to apply said pulses to step said discharge successively from one cathode to the adjacent one and means connected thereto for stabilizing the output of said signal device.

5. An automatic signal level control comprising, in combination, a source of input signals, a load device for said signals, means to produce a series of pulses only while the level of said signals to said load device differs from a predetermined value, a pulse-counting tube of the gaseous discharge type having an anode and a series of cathodes to each of which a discharge current can be successively and selectively stepped in accordance with the number of received pulses, means to apply said pulses to said counting tube to step said discharge, and means responsive to the stepping of said discharge to restore the said level of said signals to said predetermined value.

6. An automatic gain control for an amplifier comprising, in combination, means to derive a control voltage corresponding to the output level of the amplifier for a signal of given amplitude, a pulse generator, means to apply said control voltage to cause said generator to deliver pulses only while said control voltage differs from a predetermined value, a pulse-counting tube of the step-by-step discharge kind and having a series of cathodes to which the discharge can be successively stepped in accordance with the number of applied pulses, a load impedance in circuit with each cathode, said load impedances having respectively different values, said pulse-counting tube having an anode common to said cathodes, and a connection from said anode to said amplifier to adjust the gain of the amplifier in accordance with the particular cathode to which said discharge has been stepped.

7. An automatic amplifier gain control comprising, in combination, a grid-controlled amplifier tube, a balancing network, a source of standard voltage signal connected to said network, means to balance said network when the level of said amplifier output which is connected to said network bears a predetermined relation to the level of said standard signal, a pulse generator, means to trigger said pulse generator to generate pulses only when said network is unbalanced, a pulse-counting tube of the type having a series of cold cathodes to which a glow discharge can be successively and selectively stepped in accordance with the number of received pulses, a load resistance connected in circuit with each of said cathodes, said load resistances being of relatively different values, a single anode for all said cathodes, and means connecting said anode to said amplifier to adjust the output of the amplifier automatically in accordance with the particular cathode of said counting tube to which the discharge has been selectively directed.

8. An automatic gain control arrangement comprising, in combination, an amplifier device having an input circuit and an output circuit, a load circuit connected to said output circuit, a pulse generator, a gain control loop connecting the output circuit to the input circuit, said loop including a level detecting device which delivers control voltage which keys said pulse generator only when said control voltage departs from a predetermined value, a step-by-step pulse-counting tube having a series of separate discharge paths of respectively different impedances, an anode common to all said paths, means to apply said pulses to said counting tube to step the discharge successively to each path, and a connection from said anode to the input of said amplifier to maintain the output of said amplifier at a predetermined value.

9. An automatic gain control arrangement according to claim 8 in which said pulse generator comprises a relaxation oscillator normally biased at cut-off when said control voltage is at said predetermined value, and a pulse-shaper coupled to the output of said relaxation oscillator, said pulse-shaper having its output connected to the said pulse-counting tube to control the stepping of said discharge.

10. An automatic gain control arrangement according to claim 8 in which said level detecting device comprises a balancing network of the impedance bridge type, connections for coupling one diagonal of the bridge to a constant frequency signal source, and circuit connections for coupling the other diagonal of the bridge to the control circuit for said pulse generator.

11. An automatic gain control arrangement according to claim 10 in which said impedance bridge is of the alternating current type where the impedance of one arm of the bridge is controlled by the output of said variable gain amplifier.

12. An automatic gain control arrangement comprising a source of signals whose level is to be maintained at a predetermined value, a source of standard voltage, comparator means to compare both said signals and said standard voltage to produce a control voltage only when the level of said signals departs from a predetermined value, a pulse generator, means to couple the output of said comparator to said pulse generator to cause said generator to deliver output pulses only when said control voltage is different from said predetermined value, a pulse-counting tube of the type having a series of main cold cathodes and a series of discharge-transferring cathodes, an anode common to said cathodes, and means to connect the output of said pulse generator to said discharge-transferring cathodes to step the discharge from one main cathode successively to the remaining cathodes in response to the number of pulses generated by said pulse generator per unit time, and thereby to adjust the level of said signals.

13. An automatic gain control arrangement comprising a source of signals whose level is to be maintained at a predetermined value, an amplifier, a control voltage derived from the output of said amplifier, a pulse generator, means to couple said control voltage to said pulse generator to cause said generator to deliver output pulses only when said control voltage is different from said predetermined value, a pulse-counting tube of the type having a series of main cold cathodes and a series of discharge-transferring cathodes, an anode common to said cathodes, means to connect the output of said pulse generator to said discharge-transferring cathodes to step the discharge from one main cathode successively to the remaining main cathodes in response to the number of pulses generated by said pulse generator, and means connected to said pulse-counting tube to control the output of said amplifier, and thereby to adjust the level of said signals.

14. An automatic gain control arrangement comprising a source of signals whose level is to be maintained at a predetermined value, an amplifier, a control voltage derived from the output of said amplifier, a pulse generator, means to couple said control voltage to said pulse generator to cause said generator to deliver output pulses only when said control voltage is different from said predetermined value, a pulse-counting tube of the type having a series of main cold cathodes and a series of discharge-transferring cathodes, an anode common to said cathodes, means to connect the output of said pulse generator to said discharge-transferring cathodes to step the discharge from one main cathode successively to the remaining main cathodes in response to the number of pulses generated by said pulse generator, means connected to said pulse-counting tube to control the output level of said amplifier, and thereby to adjust the level of said signals during automatically selected alignment periods when a steady reference tone is received, and means for maintaining said output level constant between these alignment periods independent of the amplitude of the signal which passes through said amplifier.

15. An automatic gain control arrangement according to claim 12 in which means are provided to pre-position the discharge on a selected one of said main cathodes which pre-positioning is correlated with the said predetermined level of said signals.

16. An automatic gain control arrangement according to claim 15 in which each of said main cathodes has a different value load resistor, one of said cathodes having a value of load resistor which is correlated with the said predetermined value of said signals, whereby the discharge remains stabilized on said one main cathode as long as said signals are stabilized at said predetermined level.

17. An automatic gain control arrangement according to claim 15 in which each of said main cathodes has a different value load resistor, and including means whereby the discharge remains stabilized on one of said main cathodes until the next alignment period.

18. An oscillator frequency stabilizing arrangement comprising, in combination, an oscillator device having a frequency-determining element, a source of standard voltage signals, a comparator device for comparing the signals from the oscillator with those from said source to produce a control voltage, a pulse generator normally biased so as to generate pulses only when said control voltage is below a predetermined value, a pulse-counting tube of the step-by-step discharge kind, means connecting said pulse-counting tube to said frequency-determining element to stabilize said oscillator at a predetermined frequency, and means to apply said pulses to step the discharge in said tube to successive settings until the output of said comparator reaches said predetermined value.

19. An oscillator frequency stabilizing arrangement comprising, in combination, an oscillator device having a frequency-determining element, a frequency discriminator which produces a control voltage when the oscillator frequency deviates from the desired value, a pulse generator normally biased so as to generate pulses only when said control voltage is greater than a predetermined value, a pulse-counting tube of the step-by-step discharge kind, means connecting said pulse-counting tube to said frequency-determining element to stabilize said oscillator at a predetermined frequency, and means to apply said pulses to step the discharge in said tube to successive settings until the output of said frequency discriminator reaches said predetermined value.

20. An oscillator frequency stabilizing arrangement comprising, in combination, an oscillator device having a frequency-determining element, a frequency discriminator which produces a control voltage when the oscillator frequency deviates from the desired value, a pulse generator normally biased so as to generate pulses only when said control voltage is greater than a predetermined value, a pulse-counting tube of the step-by-step discharge kind, means connecting said pulse-counting tube to said frequency-determining element to stabilize said oscillator at a predetermined frequency, and means to apply said pulses to step the discharge in said tube to successive settings until the output of said frequency discriminator reaches said predetermined value during automatically selected alignment periods when an undeviated oscillator frequency is sent, including means for maintaining the frequency corrector at this given setting between alignment periods independent of the oscillator frequency deviation.

21. An automatic gain control system comprising an amplifier whose gain is to be stabilized, a tube having a series of cathodes with a common anode, means to set up a localized discharge between said anode and one of said cathodes, means including a pulse generator for stepping said discharge to successive cathodes, a separate return circuit between each cathode and the anode, said return circuits having respectively different impedances, means connected to the anode to develop a gain control voltage proportionate to the impedance of the return circuit connected to the particular cathode to which the discharge is stepped, means to apply said gain control voltage to a control element of said amplifier, and means to stop the stepping of said discharge when the output level of the amplifier is at a predetermined value.

22. An automatic gain control system comprising an amplifier whose gain is to be stabilized, a tube having a series of cathodes with a common anode, means to set up a localized discharge between said anode and one of said cathodes, means including a pulse generator for stepping said discharge to successive cathodes, a separate return circuit between each cathode and the anode, said return circuits having respectively different impedances, means connected to the anode to develop a gain control voltage proportionate to the impedance of the return circuit connected to the particular cathode to which the discharge is stepped, means to apply said gain control voltage to a control element of said amplifier, and means to stop the stepping of said discharge when the output level of the amplifier is at a predetermined value during automatically selected alignments periods when a steady reference signal is received, and including means for maintaining said gain control voltage constant between these alignment periods independent of the amplitude of the signal which passes through said variable gain amplifier.

23. An automatic stabilizing arrangement of the kind described comprising, in combination, a source of signals to be stabilized, a variable gain amplifier, a signal level detector, means under control of said signal level detector including a counter tube for automatically adjusting and maintaining the gain of said amplifier to a value which corresponds to the optimum output signal level, means for connecting the gain adjustment device on the reception of an alignment signal, and means for disabling the control circuit to the counter tube after the signals have been stabilized, thereby maintaining the gain of the variable amplifier at a fixed amount until alignment signals are again received.

24. An automatic stabilizing arrangement according to claim 23 in which said counter tube is of the multistable state type having a cathode and a plurality of discrete anodes to which an electronic discharge is selectively shifted in accordance with the number of input pulses applied to the counter tube.

25. An automatic stabilizing arrangement according to claim 23 in which a timing device is provided local to the stabilizing arrangement for rendering said control circuit effective only at predetermined periods of time correlated with the reception of said signals from said source.

26. A stabilizing arrangement of the kind described comprising, in combination, a source of signals to be stabilized, a variable gain amplifier, a signal level detector, means under control of said detector for producing a series of pulses correlated with the output of the detector on the reception of an alignment signal, a pulse-counting tube of the step-by-step discharge kind, means connecting said pulse-counting tube to said variable gain amplifier such that the gain of said amplifier is controlled in steps corresponding to the position of the discharge in the pulse-counting tube, means for connecting the output of said amplifier to said level detector and to the signal output terminals, means for disabling the pulsing arrangement after the signals have been stabilized, and means for rendering the arrangement operative again by the absence of signals.

References Cited in the file of this patent

UNITED STATES PATENTS

| | | |
|---|---|---|
| 2,506,668 | Haynes | May 9, 1950 |
| 2,554,905 | Hawkins | May 29, 1951 |
| 2,582,714 | Meier | Jan. 15, 1952 |